United States Patent
AlSaffar

(10) Patent No.: US 8,192,109 B2
(45) Date of Patent: Jun. 5, 2012

(54) SUBSURFACE IRRIGATION SYSTEM

(76) Inventor: Abdulreidha Abdulrasoul AlSaffar, Mubarak Alkabeer (KW)

( * ) Notice: Subject to any disclaimer, the term of this patent is extended or adjusted under 35 U.S.C. 154(b) by 255 days.

(21) Appl. No.: 12/694,456

(22) Filed: Jan. 27, 2010

(65) Prior Publication Data

US 2011/0182667 A1   Jul. 28, 2011

(51) Int. Cl.
*A01G 25/00* (2006.01)

(52) U.S. Cl. ........... 405/38; 405/48; 405/41; 239/288.5; 239/523

(58) Field of Classification Search ............. 405/36, 405/38, 40, 41, 42, 43, 44, 45, 48, 51; 239/275, 239/279, 288, 288.3, 288.5, 499, 520, 523, 239/524
See application file for complete search history.

(56) References Cited

U.S. PATENT DOCUMENTS

| | | | | |
|---|---|---|---|---|
| 770,019 | A * | 9/1904 | Neireiter | 405/41 |
| 796,590 | A * | 8/1905 | Martin | 405/41 |
| 953,080 | A | 3/1910 | Wiggins | |
| 2,707,984 | A * | 5/1955 | Goff | 405/184.4 |
| 3,084,869 | A * | 4/1963 | Hutty et al. | 239/276 |
| 3,248,884 | A * | 5/1966 | Bender | 405/184.4 |
| 3,572,630 | A * | 3/1971 | Mendenhall | 405/41 |
| 3,806,031 | A * | 4/1974 | Olson | 239/288.3 |
| 3,840,182 | A | 10/1974 | Geffroy | |
| 3,874,598 | A | 4/1975 | Havens | |
| 3,966,233 | A | 6/1976 | Diggs | |
| 4,134,550 | A * | 1/1979 | Bright, Sr. | 239/542 |
| 4,159,805 | A * | 7/1979 | von Lutzow | 239/457 |
| 4,182,583 | A | 1/1980 | McEntyre | |
| 4,317,539 | A * | 3/1982 | Pollock | 405/41 |
| 4,402,631 | A | 9/1983 | Rosenthal | |
| 4,721,408 | A * | 1/1988 | Hewlett | 405/48 |
| 4,960,345 | A * | 10/1990 | Hurley et al. | 405/38 |
| 5,024,555 | A * | 6/1991 | York | 405/48 |
| 5,042,958 | A * | 8/1991 | Stenersen | 405/184.4 |
| 5,102,259 | A * | 4/1992 | York et al. | 405/48 |
| 5,350,251 | A | 9/1994 | Daniel | |
| 5,381,959 | A * | 1/1995 | Malkin | 239/288.5 |
| 5,437,424 | A * | 8/1995 | Netz, Sr. | 405/184.4 |
| 5,938,372 | A | 8/1999 | Lichfield | |
| 6,543,704 | B2 * | 4/2003 | Stephens | 239/288.5 |
| 6,712,552 | B1 | 3/2004 | Kepler et al. | |
| 7,617,994 | B2 * | 11/2009 | Gunderson et al. | 239/288.5 |
| 2001/0032890 | A1 * | 10/2001 | Stephens | 239/288.5 |
| 2004/0253058 | A1 * | 12/2004 | Eck | 405/184.4 |
| 2010/0163651 | A1 * | 7/2010 | Feith et al. | 405/40 |

* cited by examiner

*Primary Examiner* — Frederick L Lagman
(74) *Attorney, Agent, or Firm* — Lowe Hauptman Ham & Berner LLP

(57) ABSTRACT

A subsurface irrigation system includes an athletic field or the like with a length and width equal to the length and width of the official rules for a sporting event or covering an entire agricultural field and with an excavation depth of about 25 to 50 centimeters. The system also includes a generally impervious plastic sheet or the like that covers the excavation and extends upwardly above the sides thereof. A source of water is disposed outside of the field and a plurality of distribution pipes and water distributors are disposed in the excavated area and extend substantially over the length and width of the excavation. In addition, a main channel connects the distribution pipe to the source of water and a plurality of water distributors are operatively connected to the distribution pipes for receiving water therefrom. Each of the water distributors includes an upwardly extending short pipe having a plurality of small holes around its periphery and a plurality of generally hemispherical covers that extend downwardly in the form of a right circular cylinder over the openings to protect the small holes from being clogged by a mass of soil added to the excavation to cover the subsurface irrigation system and support the growth of ground cover thereon.

12 Claims, 6 Drawing Sheets

SUBSURFACE IRRIGATION SYSTEM

FIELD OF THE INVENTION

This invention relates to a subsurface irrigation system and more particularly to a subsurface irrigation system for an athletic or agricultural field.

BACKGROUND FOR THE INVENTION

Subsurface irrigation systems are well known and have been in use for many years. For example a U.S. Pat. No. 953,080 of Wiggins discloses an irrigation pipe that supplies water to a main conduit and a series of upwardly directed nozzles and a plurality of covers with one cover for each nozzle to protect the nozzle form becoming clogged.

A more recent patent, U.S. Pat. No. 4,721,408 of Hewlett discloses a water distribution system characterized by a construction including an irrifluent pipe disposed below the soil surface for dispersing water or treated waste water at a controlled rate. The irrifluent pipe includes an inner fluid conduit having apertures formed therethrough and an outer cover mounted in partially surrounding relation to the inner conduit and overlying the apertures. The outer cover is attached to the inner fluid conduit in spaced apart relation thereto so that the dispersed fluid slowly seeps into the ground.

A further U.S. Pat. No. 5,350,251 of Daniel discloses a system for controlling the moisture content of a planted surface. The system includes a plurality of drain conduits located beneath the planted surface for collecting liquid from the planted surface. The system also includes a sealed collection tank coupled to the plurality of drain conduits. The collection tank is located beneath the planted surface to collect liquid passing through the plurality of drain conduits. The system also includes a vacuum pump coupled to the collection tank for removing air from the collection tank for removing air from the collection tank to provide a suction force in the collection tank and in the plurality of drain conduits to draw a liquid from the planted surface through the plurality of drain conduits and into the collection tank. An elevated air tank is coupled between the vacuum pump and the collection tank. The elevated air tank is located at a remote location spaced apart from the collection tank. The vacuum pumps remove air from the air tank which causes the suction force on the air tank, in the collecting tank, and in the plurality of drain conduits. Soil moisture sensors automatically operate programs for favorable turf growth and playing conditions.

A still further U.S. Pat. No. 5,938,372 of Lichfield discloses another subsurface irrigation apparatus and method wherein the method and apparatus include an underlayment of water resistant material which also serves as a mounting surface for the remaining elements of the subsurface irrigation apparatus. Water is supplied to the subsurface irrigation apparatus through a water supply conduit and distributed through a plurality of water distribution conduits. Each water distribution conduit includes a plurality of spaced holes through which the irrigation water is distributed by the water distribution conduits. A diffuser is mounted across each hole to diffuse the water into the surrounding soil Each diffuser is includes a layer of fibrous material partially covered by a water resistant overlayment. The fibrous layer diffuses the water outwardly from the hole while simultaneously inhibiting root encroachment into the hole. A layer of course sand may be overlayed across said subsurface irrigation apparatus for helping diffuse the water into the soil, particularly those soils having a high content of clay. A valve and a controller to control the valve are also included. A moisture sensor can also be used to sense the moisture level in the soil to activate the controller.

Finally, a U.S. Pat. No. 6,712,552 of Kepler et al. discloses an economical and easily installed irrigation system for agricultural products covering large areas. The invention comprises top and bottom layers of geosynthetic material having a non-cohesive, porous material between the layers. A water distribution system is also placed between the layers. This system can be placed directly on the area to be irrigated without digging a trench or hole. Agricultural products such as turf or row crops are placed within top soil directly on the system.

Notwithstanding the above it is presently believed there is a need and a potential commercial market for an improved subsurface irrigation system for an athletic or agricultural field in accordance with the present invention. There should be a need for such systems because they are durable and provide year round irrigation of such fields and can be used to obtain an athletic field in pristine condition, for use in conduction sports events and healthy ground cover.

BRIEF SUMMARY OF THE INVENTION

In essence, the present invention contemplates a subsurface irrigation system for an athletic or agricultural field. The system includes means defining a field for an athletic field or the like with a length and width equal to the length and width in accordance with the official rules for a sporting event and with an excavation depth of about 25 to 50 cm extending over the length and width of the field. The system also includes a generally impervious plastic sheet or the like that covers the excavation and extends upwardly along the sides thereof. A source of water disposed outside of the field and a plurality of distribution pipes are disposed in the excavated area and extend substantially over the length and width of the excavation. In addition, a main channel connects the distribution pipes to the source of water. The system also includes a plurality of water distributors extending upwardly from the distribution pipes for receiving water across the excavation. Each of the water distributors comprises an upwardly extending short pipe having a plurality of small openings around its periphery. In addition, a plurality of generally hemispherical shaped covers that extend downwardly over the openings with a cover for each water distributor are provided to protect the small openings from becoming clogged when the excavation is filled with soil that will support plant growth.

The invention will now be described in connection with the following drawings wherein like numerals have been used to identify like parts.

DESCRIPTION OF THE DRAWINGS

FIG. 1b illustrates the athletic field shown in FIG. 1a but partially cut away to illustrate the upwardly extending water distributors and distribution pipes.

DESCRIPTION OF THE PREFERRED EMBODIMENTS OF THE INVENTION

Figure 1A:
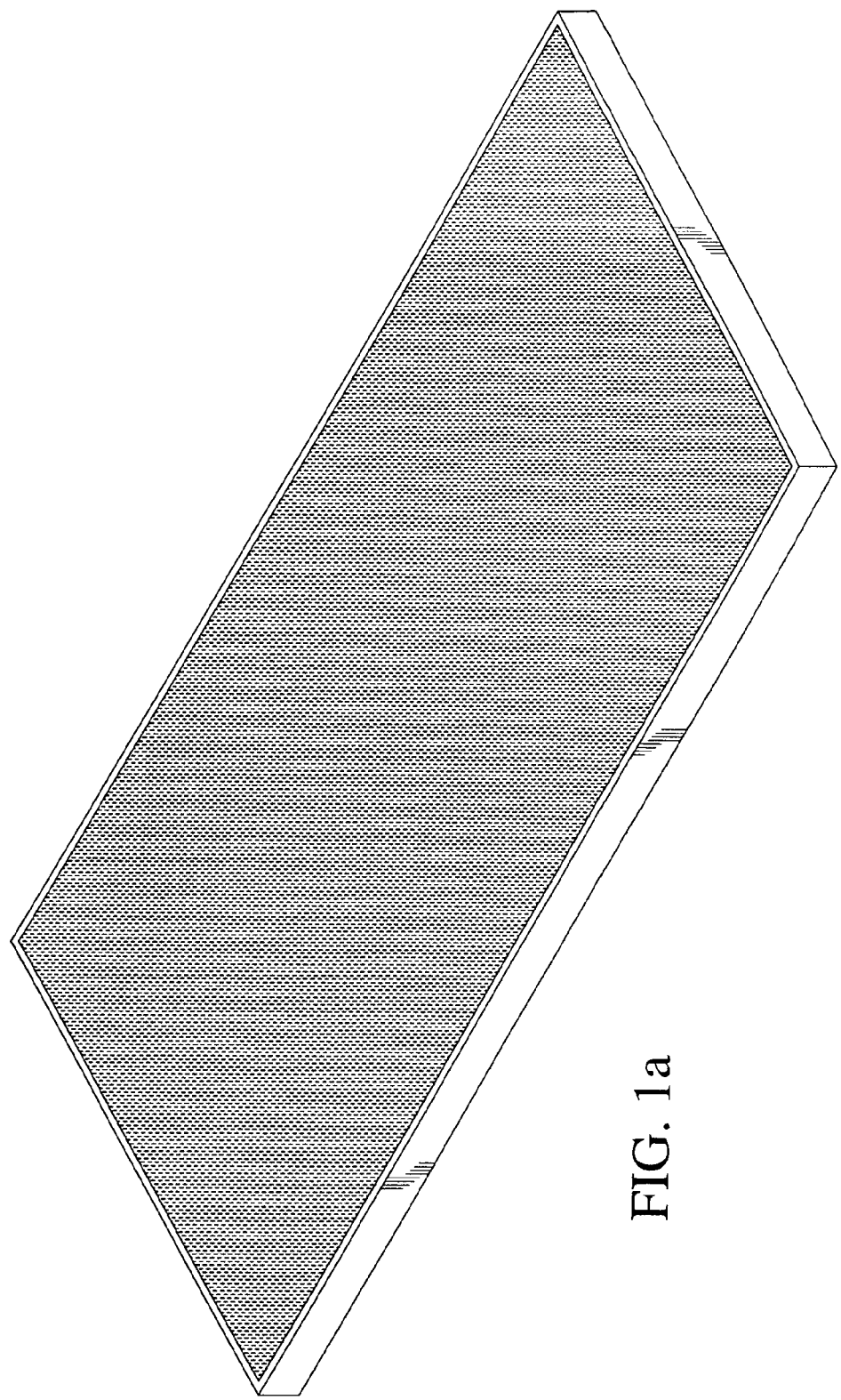
FIGS. 1a and 1b illustrate an athletic playing field that includes an irrigation system in accordance with the present invention.
Figure 1B:
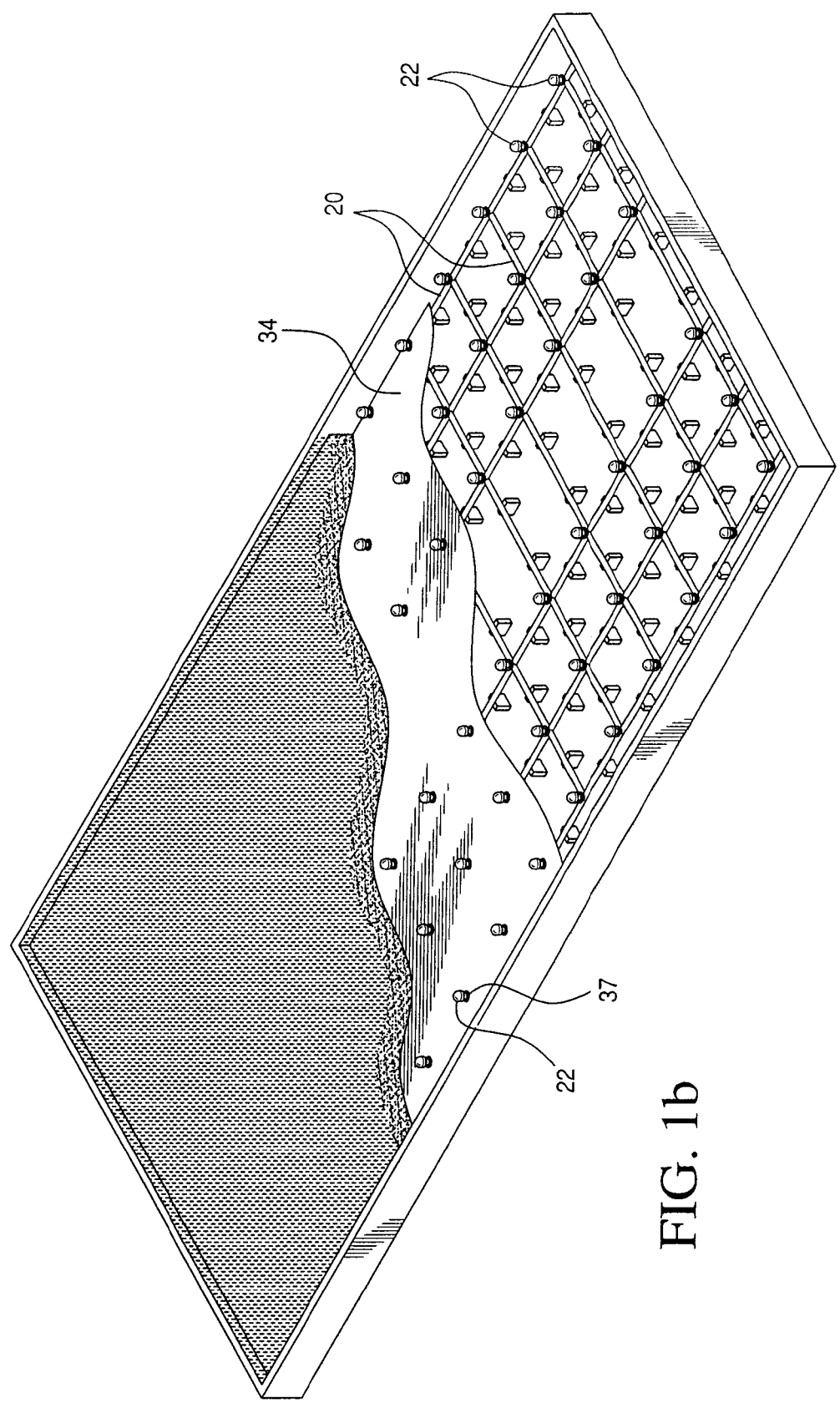
Figure 2:
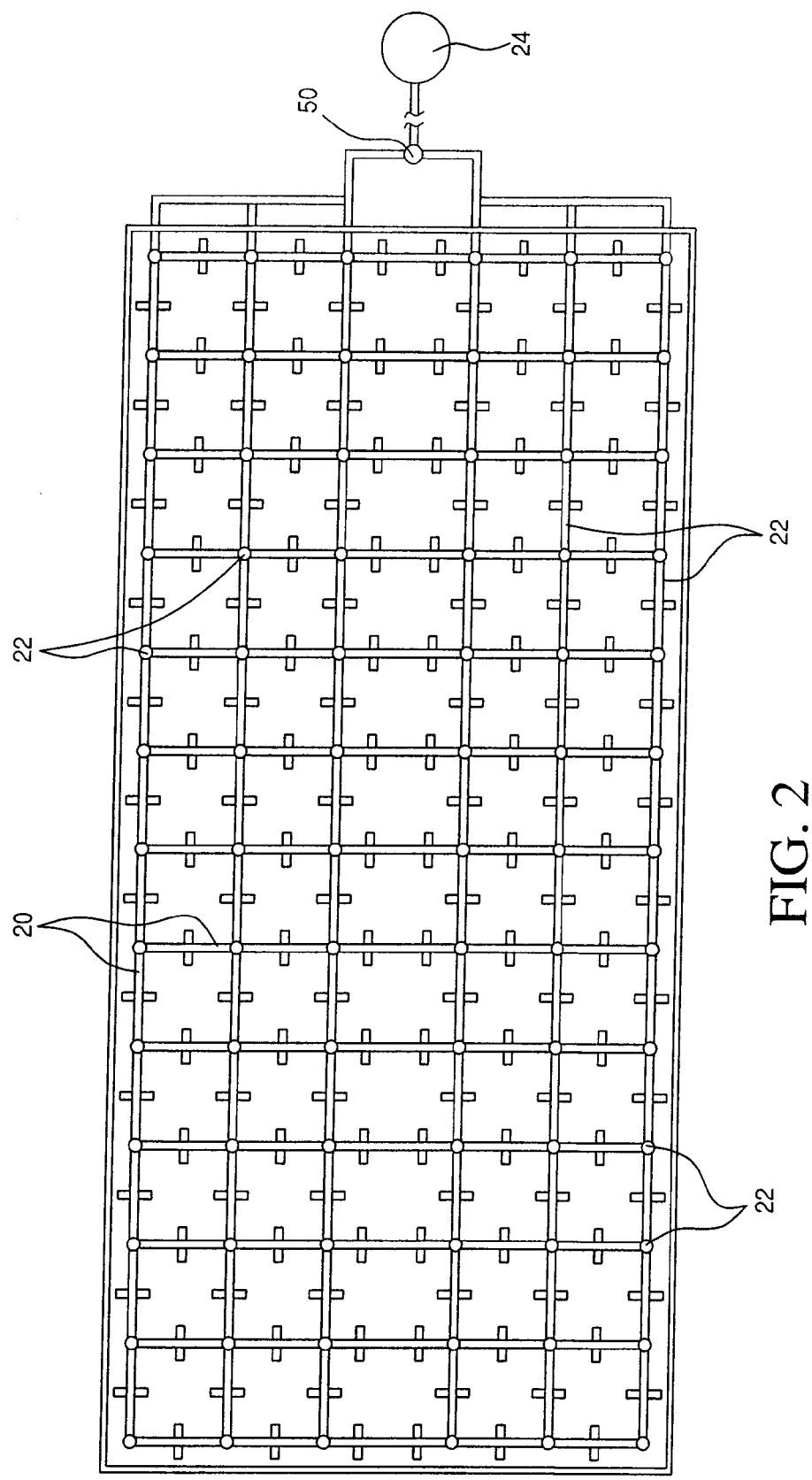
FIG. 2 is a schematic plan view of a typical instillation of a subsurface irrigation system in accordance with the present invention.
Figure 4:
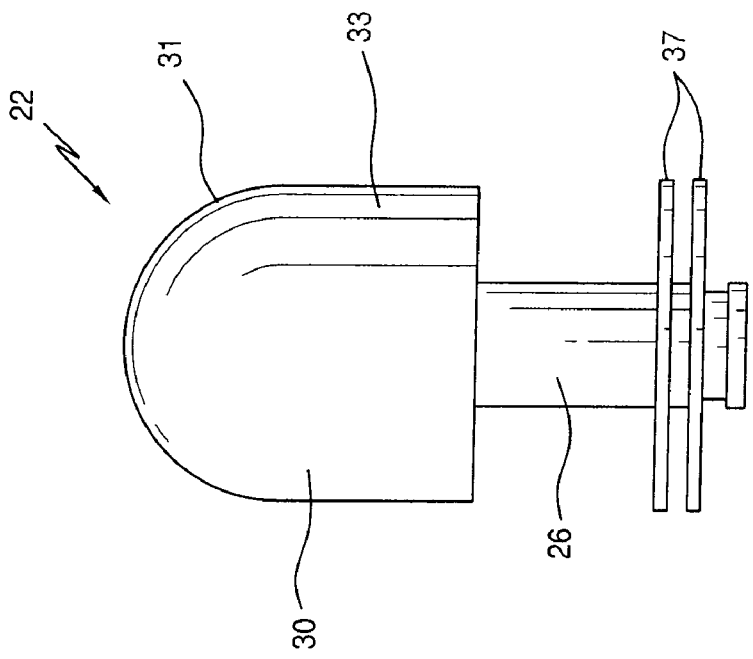
FIG. 4 is a side elevational view of a water distributor including an upwardly extending pipe and cover.
Figure 3:
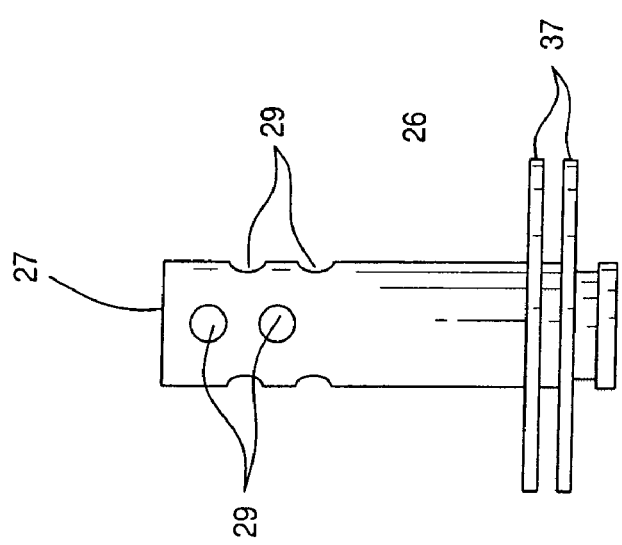
FIG. 3 is a side elevation of an upwardly extending pipe as used in a water distributor incorporated in a subsurface irrigation system in accordance with the present invention.
Figure 5:
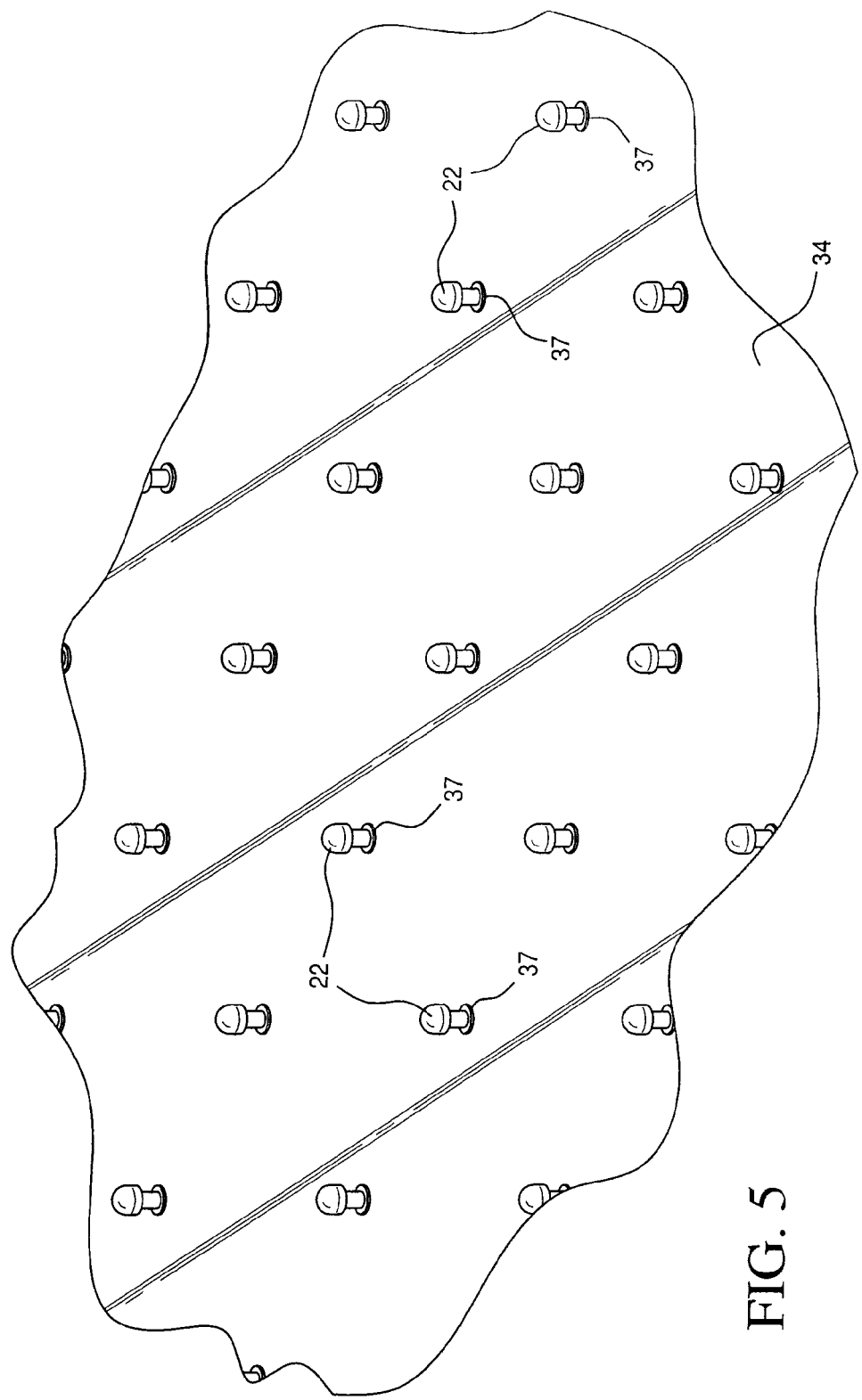
FIG. 5 is a perspective view of a plurality of water distributors extending upwardly through an impervious plastic sheet in accordance with the present invention.

A subsurface irrigation system for an athletic field or the like as for example a soccer field covers an area of about 100 meters by 50 meters. As shown in FIG. 1*a* an area of the field is covered with grass and yet includes a number of distribution pipes 20 and upwardly extending water distributors 22 (see FIG. 1*b*) for irrigating the field. As illustrated in FIG. 2 the distribution pipes 20 which are preferably made of plastic and may have a diameter of about 1 inch are disposed above the water distributors 22 but connected thereto in a conventional manner for supplying water from a water source 24 to the water distributors 22.

In a preferred embodiment of the invention, each of the water distributors 22 includes an upwardly extending short pipe 26 that includes an open top 27 and a plurality of small holes 29 around the periphery of an upper portion thereof. The upper portion of the water distributors 22 including the holes 29 are each covered with a cover 30 that includes a hemisphere shaped portion 31 and a downwardly extending cylindrical portion 33 that covers the holes 29 and prevents soil from plugging the holes.

The upper portion of the water distributors 22 extend upwardly through the impervious plastic cover 34 with a seal 37 to prevent water from leaking to the ground below the impervious plastic sheet.

Figure 6:
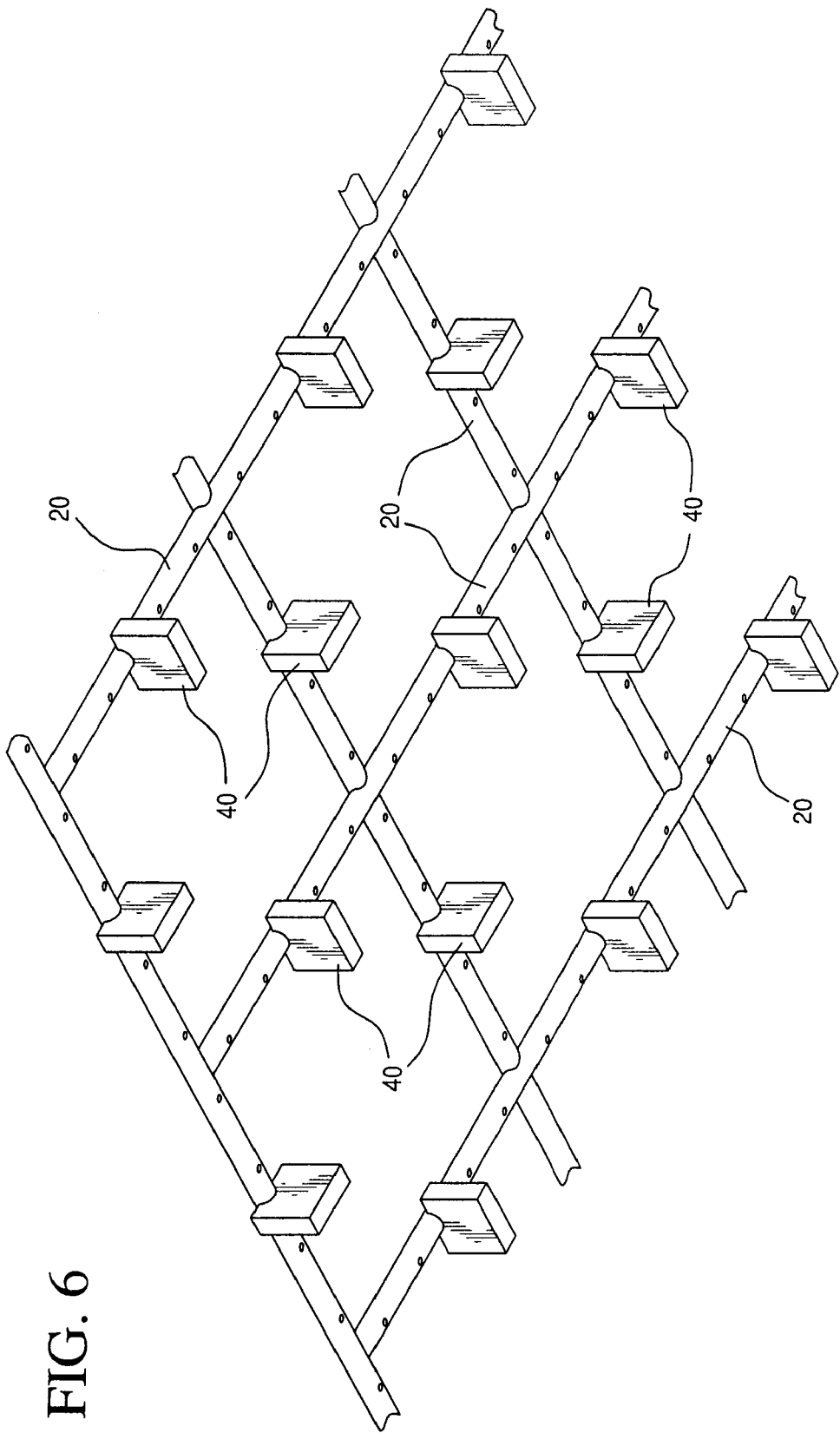
FIG. 6 is an array of water distribution pipes and support members as used in one embodiment of the invention.

A plurality of support members 40 as shown in FIG. 6 support the water distribution pipes 20 above the ground at the bottom of the excavation. In one embodiment of the invention the distribution pipes 20 are disposed below the cover 34 and the water distributors 22 extend upwardly through the cover 24 with a seal 31 to prevent water from leaking to the ground below the cover 34.

While the depth of the excavation is between 25 and 50 cm, care should be taken to assure that the water distributors have at least about 10 to 15 cm of soil covering the top of the covers 30 to avoid the possibility of a participant or fan tripping over the cover 30 or falling on the cover 30. This is another reason for using plastic pipe and plastic covers. In addition, a valve 50 with a timer keeps the soil irrigated on a year round basis for supporting the growth of ground cover.

In a further embodiment of the invention, the water drainage pipe includes a plurality of small holes in the bottom surface thereof to permit small amounts of water to moisten the soil directly below the water distributors.

For larger athletic fields the measurement of each square made up of distribution pip is about one meter to one and one half meters in order to cover the entire field. These pipes or squares indicate a plurality of water distributors 20 and 22 that are spaced no more than about 20 cm from one another and are connected to one of the water distribution pipes 20. In this way the entire field will be damp with the moisture controlled by a computer controlled valve that assures more water in the spring, summer and autumn than in the winter.

In the preferred embodiment of the invention, all parts are made of plastic and may be provided in all types of soil. For example, the field may be desert, dry soil, rocky land or uncultivated soil, or salty land provided however, that the soil used to fill the excavated area should be good soil that will support growth of grass or the like. Thus the invention may have broad application ranging from residential neighborhoods to airports, highway mediums, hospital grounds, etc.

While the present invention contemplates the use of plastic pipes and water distributors, the preferred embodiment of the invention contemplates the use of polyvinyl chloride (PVC) as intended to operate at relatively low pressures as for example 5-15 psi.

The advantage of a subsurface irrigation system as opposed to an above ground system is well known. For example, the use of a subsurface system is that it essentially eliminates the loss of water due to evaporation and provides water near the roots of a plant where it is most beneficial.

While the invention has been described in connection with its preferred embodiments it should be recognized that changes and modifications may be made therein without departing from the scope of the appended claims.

What is claimed is:

1. A subsurface irrigation system for an athletic or agricultural field, said irrigation system comprising:

means for defining a field for an athletic event with a length and width equal to the length and width of a field for a selected sport with an excavation depth of about 25-50 cm;

a generally impervious plastic lining covering said excavation and extending upwardly along each side thereof;

a source of water disposed outside of said field, a plurality of distribution pipes disposed in said excavation and extending over said excavation and a main channel connecting said distribution pipes to said source of water;

a plurality of water distributors extending upwardly from each of said distribution pipes for receiving a supply of water and said distribution extending through said lining;

each of said water distributors comprising an upwardly extending short pipe with an open upper end and plurality of relatively small openings in an upward portion thereof and extending around said upwardly extending pipe;

a plurality of covers with one of said covers extending over each of said distributors and downwardly along the sides thereof for covering the relatively small holes to thereby prevent dirt from blocking said openings; and a mass of soil filling said excavation above said lining for supporting the growth of ground cover.

2. A subsurface irrigation system according to claim 1 in which each of said covers includes a hemispherical top and a cylindrical lower portion extending down below said relatively small openings.

3. A subsurface irrigation system according to claim 2 in which each of said distribution pipes includes a water distributor about every 20 cm along the length of said distribution pipe.

4. A subsurface irrigation system according to claim 3 in which said distribution pipes and said water distributors are made of metal.

5. A subsurface irrigation system according to claim 3 in which said distribution pipes and said water distributors are made of plastic.

6. A subsurface irrigation system according to claim 3 in which said distribution pipes and said water distributors are made of polyvinyl chloride (PVC).

7. A subsurface irrigation system according to claim 6 which includes means for sensing the moisture in said soil and means for adding water to said soil when the moisture content falls below a pre-selected amount.

8. A subsurface irrigation system according to claim 1 which includes means for sensing the water in said soil and means for adding water to said soil when the moisture in said soil reaches a pre-selected dryness.

9. A subsurface irrigation system for an athletic or agricultural field, said irrigation system consisting of:
- means for defining a field for an athletic for a selected sport with a length and width equal to the length and width complying with the official rules of the sport and an excavation depth of about 25 and 50 centimeters;
- a source of water disposed outside of said field, a plurality of distribution pipes disposed in said excavation and extending substantially over said athletic field and a main channel connecting said distribution pipes to said source of water;
- a generally impervious plastic lining covering said excavation and extending upwardly along the sides thereof;
- a plurality of water distributors extending upwardly from each of said distribution pipes for receiving a supply of water from said distribution pipes;
- each of said water distributors comprising an upwardly extending short pipe with an open upper end and plurality of relatively small openings in an upward portion thereof and extending around said upwardly extending pipe;
- a plurality of covers with one of said covers extending over each of said water distributors and downwardly along the sides thereof for covering the relatively small holes to thereby prevent dirt from entering the relatively small openings; and
- whereas each of said distribution pipes includes a water distributor at about 20 cm spacing along the length of said distribution pipe.

10. A subsurface irrigation system according to claim 9 in which said distribution and distribution pipes are metal.

11. A subsurface irrigation system according to claim 9 in which said distribution and distribution pipes are plastic.

12. A subsurface irrigation system according to claim 9 in which said distribution pipes are disposed below said plastic lining and include a plurality of support members for supporting said pipes above the bottom of said excavation.

* * * * *